Jan. 15, 1929.

C. B. COOK 1,699,348

METHOD FOR FORMING BEVELED LEATHER STRIPS

Filed Jan. 30, 1926

Inventor:-
Carl B. Cook.
by his Attorneys
Howson & Howson

Patented Jan. 15, 1929.

1,699,348

UNITED STATES PATENT OFFICE.

CARL B. COOK, OF HADDONFIELD, NEW JERSEY.

METHOD FOR FORMING BEVELED-LEATHER STRIPS.

Application filed January 30, 1926. Serial No. 84,950.

The object of this invention is to provide a novel and highly advantageous machine and method for forming beveled leather strips or laces.

In the attached drawings, in which I have illustrated an embodiment of the invention:

Figure 2:
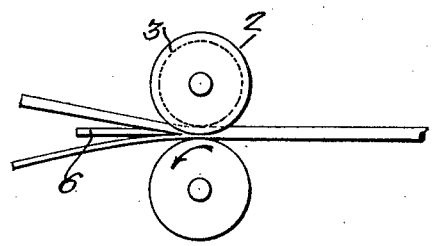
Fig. 2 is a side elevation of the rollers showing the stripping knife which acts in conjunction therewith, and also illustrating the manner in which the leather blank from which the laces are made is fed through the machine.

With reference to the drawings, the machine in its essential parts comprises a pair of cooperating rollers 1 and 2 of suitable width, the roller 1 in the present instance being smooth-faced, while the face of the roller 2 is formed with a series of parallel annular depressions 3 which are substantially the same in width as the laces and whose depth is slightly greater than the thickness of the finished lace as hereinafter described. These rollers may be operated from any suitable external source of power. In the present instance I have shown the shaft 4 of the roller 1 provided with a pulley 5 for connection with the source of power (not shown). The rollers 1 and 2 may be operatively connected by means of gearing if this is found desirable.

Operating in conjunction with the rollers 1 and 2, as shown in Fig. 2, is a stripping blade 6 which is made sufficiently thin and is so beveled at its working edge that the latter may fit close in between the rollers 1 and 2, as clearly illustrated, and suitable means (not shown) may be employed for adjusting the cutting edge of the blade with respect to the space between the two rollers 1 and 2.

Figure 4:
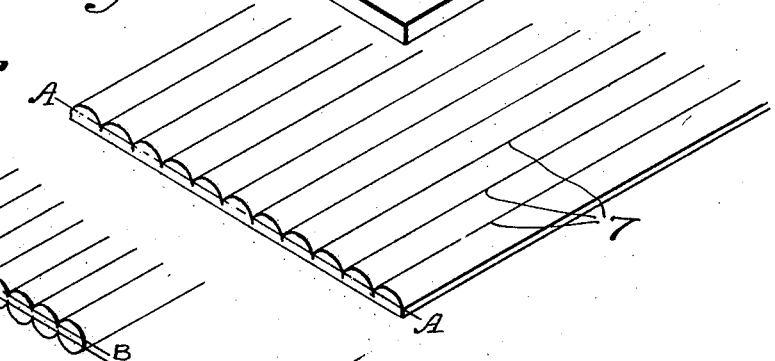
Fig. 4 is a view of the blank as it would appear if it were passed through the rollers and not operated upon by the stripping blade.

In using this mechanism, a strip of leather, of suitable width and in thickness substantially the same as the space between the face of the roller 1 and the bottom of one of the grooves 3, is fed between the rollers and is carried through by reason of the rotation in the direction of the arrow, see Fig. 2 of the roller 1. In this operation, the roller 2 is turned through the frictional contact with the leather blank advanced by the roller 1. As the blank passes between the rollers the upper face thereof is pressed into a parallel, longitudinal and closely set row of bevels 7, as shown in Fig. 4, and immediately following its passage between pressure rolls, the forward edge of the blank engages the cutting edge of the blade 6 which has been so adjusted with relation to the rolls 1 and 2 that it divides the leather blank on a line A—A, indicated in dot and dash in Fig. 4, which extends parallel to the faces of the leather blank and slightly above the bottoms of the bevels 7, as clearly illustrated, so that as the blank is divided or split by the blades 6, a plurality of separate strips or laces 8 are formed which are substantially flat on the under side and which on the upper side are beveled or rounded off.

This process has several decided advantages, amount which is the comparative uniformity of the beveled laces obtained, and the tendency of these laces to maintain their beveled form.

Figure 1:
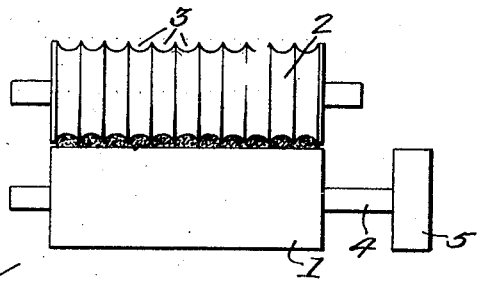
Figure 1 is a front view of the compression rollers forming a part of the machine.
Figure 3:
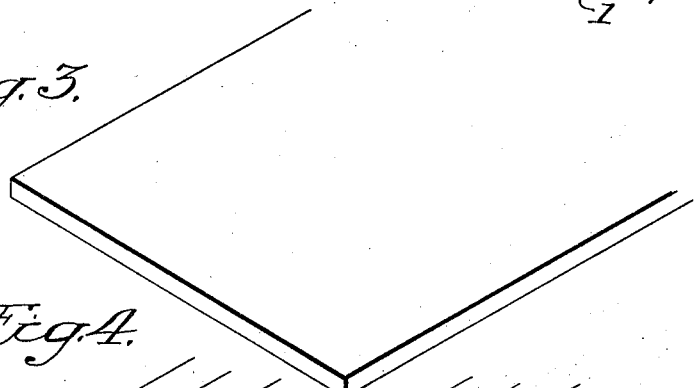
Fig. 3 is a view in perspective of the blank in its original condition.
Figure 6:
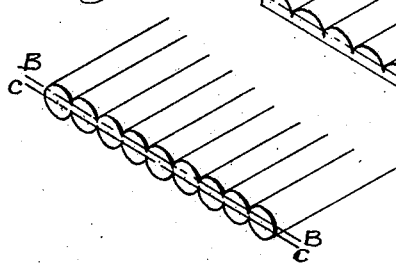
Fig. 6 is a view in perspective of a beveled leather blank illustrating a modification.
Figure 5:
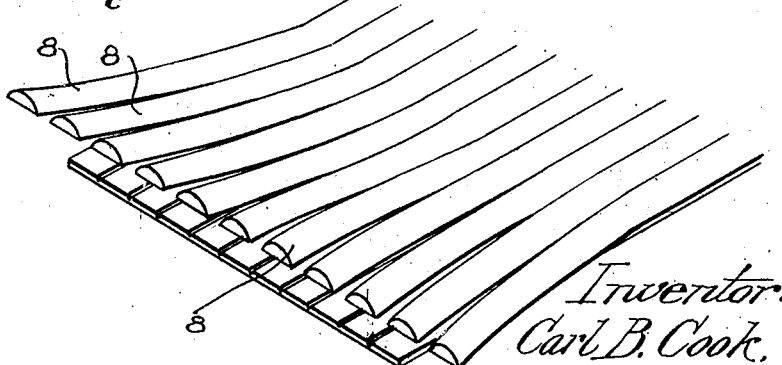
Fig. 5 is a view of the inner end of the blank as it appears after passing through the roller and after it has been acted upon by the stripping blade.

The invention is capable of some modification without departure from the invention, such for example as employing a second bevel-faced roller 2 in place of the smooth-faced roller 1, with the result that the leather blank, which in this case must be of greater thickness than the blank used in the form of the machine illustrated in Figs. 1 and 2, will be beveled on both sides; and employing two stripping blades instead of the single blade shown in Fig. 2 to split the beveled blank along the lines B—B and C—C indicated in Fig. 6. In this maner each blank is made to deliver two sets of beveled laces in a single operation.

I claim:

1. The method of forming beveled strips or laces of leather, which consists in taking a substantially smooth-faced blank, impressing at least one face of said blank to form a plurality of longitudinal beveled ridges, and splitting the blank on a line substantially parallel to the impressed face and intermediate the tops and bottoms of said impressions.

2. The method of forming beveled strips or laces of leather, which consists in taking a suitable blank, forming the blank on at least one face with a plurality of longitudinally extending beveled ridges, and splitting the blank along a line substantially parallel to the impressed surface and intermediate the tops and bottoms of said impressions whereby the individual impressed sections are separated from the blank in the form of a plurality of separate beveled strips.

CARL B. COOK.